(No Model.) 2 Sheets—Sheet 1.
M. W. DEWEY.
CONVERTER SYSTEM FOR ELECTRIC RAILWAYS.
No. 473,253. Patented Apr. 19, 1892.
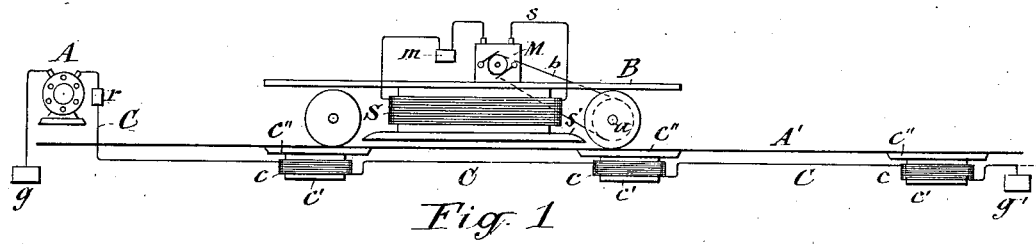
Fig. 1
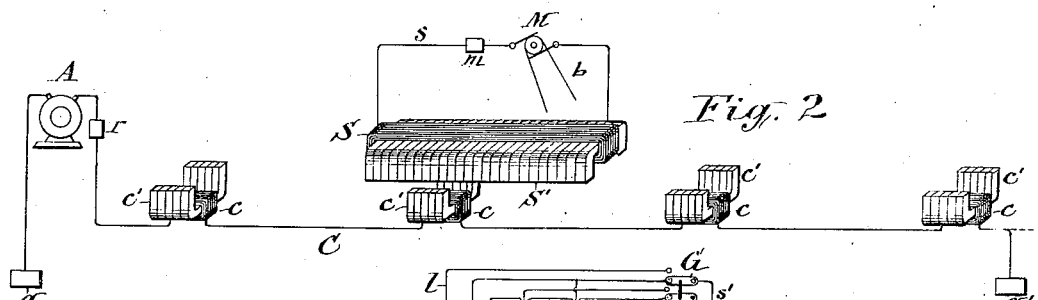
Fig. 2
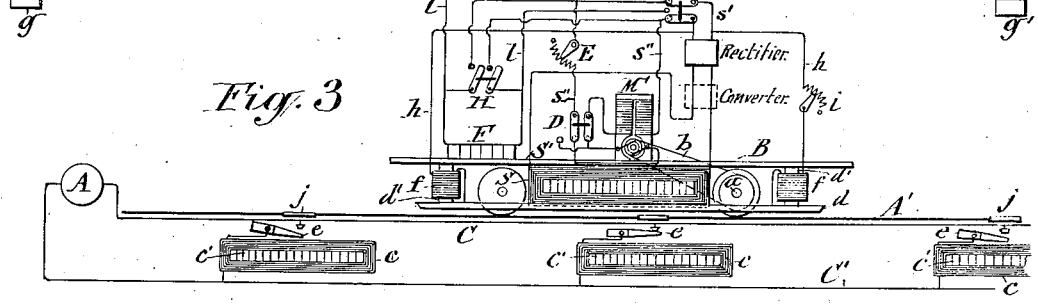
Fig. 3
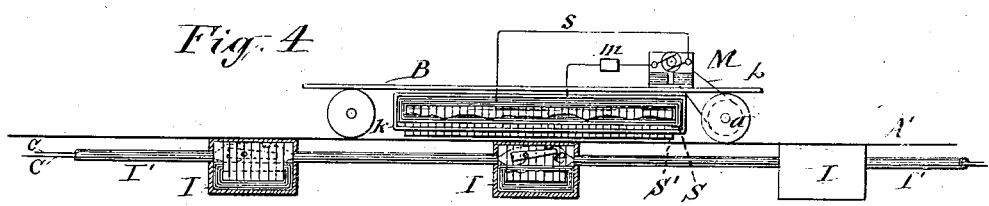
Fig. 4
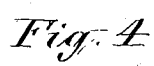
Fig. 6
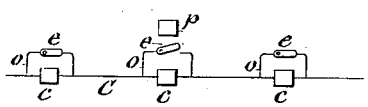
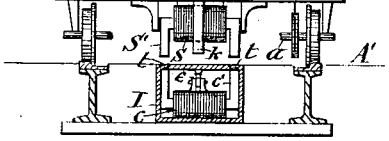
Fig. 5    Fig. 7
WITNESSES:
C. L. Bendixon
H. M. Seamans
INVENTOR
Mark W. Dewey
BY
Duell, Laass & Duell
his ATTORNEYS (No Model.) 2 Sheets—Sheet 2.
M. W. DEWEY.
CONVERTER SYSTEM FOR ELECTRIC RAILWAYS.
No. 473,253. Patented Apr. 19, 1892.
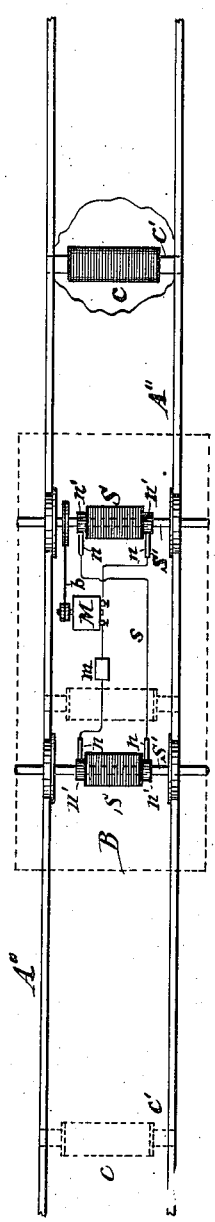
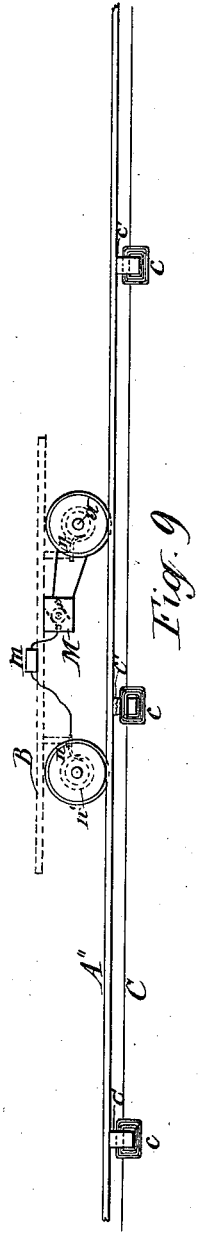
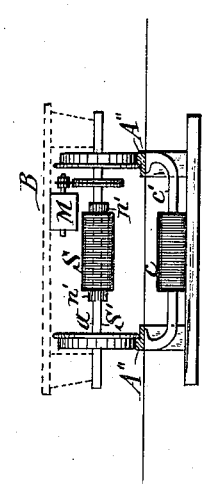
WITNESSES:
INVENTOR:
Mark W. Dewey
BY
ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

CONVERTER SYSTEM FOR ELECTRIC RAILWAYS.

SPECIFICATION forming part of Letters Patent No. 473,253, dated April 19, 1892.

Application filed June 25, 1889. Serial No. 315,457. (No model.)

*To all whom it may concern:*

Be it known that I, MARK W. DEWEY, of Syracuse, in the county of Onondaga, in the State of New York, have invented new and useful Improvements in Electric Traction, of which the following, taken in connection with the accompanying drawings, is a full, clear, and exact description.

My invention relates to propelling or moving vehicles—such as cars and boats—electrically; and the object is to dispense with contact-brushes, wheels, &c., in electric connection with a conductor along the route of the vehicle to allow the employment of currents of great strength, or to avoid the necessity of employing heavy and expensive batteries on the vehicle.

The invention consists in improved means for electrically communicating with a vehicle to propel the same or to supply other translating devices thereon by induction and without contact with the line-conductor.

The invention consists, further, in locating in the line conductor separate coils of wire distributed equal distances apart along the roadway, preferably beneath the same. The said coils may be arranged in any suitable manner, provided that they or their cores are in proper inductional relation to the secondary coil carried by the vehicle, and may be connected with the line-circuit either in series or parallel. Said coils may all be constantly in circuit, or they may be included in circuit only when the car is over them or in suitable inductional proximity thereto. The said coils, being located in the primary circuit, are termed "primary coils," and may be provided with solid or laminated paramagnetic or iron cores or bodies of any desired form and the whole inclosed, insulated, and protected, as required, or the coils may be without any cores in some cases.

In the accompanying drawings, Figure 1 is a diagram of circuits and apparatus, illustrating the primary coils distributed along the path of a vehicle and connected in circuit in series. Fig. 2 shows laminated cores within the coils, having both of their poles extended to the surface of the road-bed or in proximity thereto, so as to approach the poles of the core on the vehicle. Fig. 3 shows the primary coils connected in parallel and circuit makers and breakers in circuit, with the coils operated by magnetic attraction from the car, so that the current can flow through a coil or coils only when a car is over or in the vicinity thereof, whereby a great saving of energy is derived. Fig. 4 illustrates the manner in which the conductor and apparatus in circuit therewith is inclosed and protected, and illustrates, also, novel means for operating the contact makers and breakers. Fig. 5 shows an end elevation of Fig. 4. Fig. 6 is a modified form of a part of Fig. 3. Fig. 7 shows a closed magnetic circuit formed of the cores of a primary and secondary coil; and Figs. 8, 9, and 10 show, respectively, plan, side, and end views, partly in section, of an electric railway equipped with my invention and magnetic contact made by rails of track and wheels of vehicle.

It will be obvious that the apparatus may be widely varied without departing from the spirit of my invention herein set forth, and therefore I do not desire to be limited to the specific arrangements shown and described.

Referring specifically to Fig. 1 of the drawings, A represents a stationary source of irregular or alternating electric currents of suitable tension or strength, and preferably in the shape of an alternating-current dynamo. One of the terminals of the dynamo is connected with a ground-plate $g$ and the other terminal is connected with a conductor C, leading through a suitable current-regulator $r$ and extending along the route or path of a vehicle B, which may be hereinafter termed a "car."

$c\ c\ c$ represent coils of wire connected in the circuit C in series and distributed apart, preferably equidistantly apart, along the path of the vehicle or railway. $c'\ c'\ c'$ are cores of iron within the said coils, arranged with their axes in a direction at right angles to the surface of the road-bed A'. The terminus of the conductor is connected with ground-plate $g'$. Instead of returning the current through the ground, a return metallic conductor may be employed.

Upon the car B is carried a secondary coil S, having a core S', the axis of which is parallel with the axes of the primary cores. The secondary coil is larger than the primary coils, and may be formed of somewhat larger wire. The cores of all the coils have their neighboring poles $c''$ extended longitudinally to allow the primary coils to be placed greater distances apart, and thus decrease the number of primary coils to a minimum. The poles of the primary coils may extend to or in proximity to the surface of the road-bed, and may in some cases extend slightly beyond the surface. Solid cores are represented in this figure; but they may be laminated to prevent cross-currents, and thereby increase their effect.

M represents an alternating-current motor of suitable construction, and $m$ denotes a current controller or regulator, both connected in circuit $s$ with the coil S. The motor M is connected with the driving-axle $a$ by a chain or belt $b$, but may be of course arranged or connected with the vehicle for propelling the same in any other suitable manner. I do not limit myself to the extended poles of the core, or when such extended poles are employed to the size or length of the extension or to the length of the lap of the primary poles under the vehicle-core when the vehicle-coil is in a central position between two primary coils. Neither do I limit myself to the single vehicle-coil, for it will be obvious that more than one may be employed.

Referring now to Fig. 2, A represents an alternating-current dynamo; $r$, the regulator; C, the line conductor extending along the road or path of the vehicle; $g$ and $g'$, the ground-plates at the ends of the road; $c\ c\ c$, primary coils connected in circuit C in series, and $c'\ c'\ c'$ the cores or bodies of iron in the coils. The cores are of paramagnetic metal, as iron, and are shown as laminated in this figure and have their poles extended to, beyond, or in proximity to the surface of the road-bed and located on opposite sides of the center thereof, and their bodies in proper inductional relation to the coils surrounding them.

S and S' represent a similar coil and core inverted, to be carried by a vehicle, as B, in Fig. 1. This coil and core is preferably much longer than a primary coil and core; but the secondary coil may be of the same length or even shorter than the primary coil. When the vehicle coil and core is made long, the primaries may be distributed a greater distance apart, thereby making the construction of the road less expensive.

As before stated, the vehicle coil and core are inverted, but in other respects may be the same or similar to a primary coil and core. The poles of said vehicle-core are therefore extended to or in proximity to the surface of the road-bed or to the poles of the primary cores. By this arrangement a great inductional effect is derived, as the core on the vehicle or secondary core and the core or cores of the primaries form almost a closed magnetic circuit. A maximum effect, however, may be derived by attaching yielding iron rollers or brushes $t'$ to the poles of the secondary core to make contact with the pole of one or more primary cores, as illustrated in Fig. 7, thus forming an entirely-closed magnetic circuit.

I do not limit myself to the length of the primary coil, for it may extend the entire length of the route, if desired. It will be obvious, also, that the poles of the cores of the primary coils may be provided with extensions $c''$, as shown in Fig. 1, thus allowing the coils to be placed farther apart.

M represents the electric motor, and $m$ the current-regulator on the vehicle, connected in circuit with the vehicle-coil or secondary circuit, and $b$ the belt to connect the motor with the driving-axle of the vehicle, as in Fig. 1.

It will be obvious that a coil and core is not absolutely necessary on the vehicle or car, as a simple conductor carried in proper inductional relation to the primary coils or cores, or both, of the line-conductor will be able to produce some effect upon a translating device in electrical connection therewith; but in order to derive a very great amount of power on the vehicle the conductor is formed of a coil of a great number of convolutions, and to still further increase the power the said coil is provided with a magnetic core, and this core is laminated, as hereinbefore mentioned, to increase its magnetic effect. It is not absolutely necessary either to form the electric conductor on the vehicle of a closed circuit, for as alternating currents circulate in the same a condenser of suitable capacity may be interposed in the circuit in some cases with good results and without diminishing the power of the current therein.

In Fig. 3, A indicates a suitable source of irregular or alternating electric currents, as an alternating-current dynamo. C and C' represent line-conductors extending therefrom along the road. $c\ c\ c$ are the primary coils, and $c'\ c'\ c'$ the cores. Although the cores of the coils are shown in this figure as straight and not extended to or near the surface of the road-bed, it will be obvious that they may be arranged the same or similar to the arrangement shown in Fig. 2. The main difference, however, between the primary parts of Figs. 2 and 3 is that the coils are connected with the circuit in parallel or multiple arc, and they are all normally out of circuit, and consequently no current flowing through them. Contact makers and breakers or switches $e\ e\ e$ are placed in the coil-conductor, one for each coil, and are designed to be automatically operated by a suitable magnetic device carried on the vehicle, which will attract one or more of the switches in the vicinity of the vehicle to include one or more coils beneath or in the vicinity of said vehicle in circuit with the conductor, and thus concentrate at the car and at no other part of the road the inducing power. These switches and electric connections therewith may be greatly varied in form, and I therefore do not limit myself to the precise form and construction shown, but will say that in all cases a switch will consist, essentially, of a movable part with a contact to make and break the circuit. The switches shown are preferably made of paramagnetic material, as iron, or the movable end thereof. The opposite end is pivoted to a suitable support connected with one terminal of the coil-conductor and is preferably formed of non-magnetic material, and the other or movable end is designed to be brought in contact when attracted with a stationary contact connected with the other terminal of the conductor. These switches are balanced or arranged so that they will be operated easily and without great attractive power and should be inclosed completely in suitable water-tight boxes, as hereinafter more fully described.

The magnetic device upon the vehicle may also be greatly varied. This figure shows the device as a bar $d$ of iron extending near and parallel to the surface of the road-bed and in the same direction as the movement of the vehicle. Supports $d'\,d'$, of iron, forming cores for coils $f\,f$ in circuit with the vehicle conductor, support said bar. In order to magnetize the said bar to attract the switches, a direct current is preferably employed—that is, the alternating current of the secondary circuit on the vehicle is straightened or rectified by means of a suitable current-rectifying device indicated in the figure and not necessary to be described herein more fully, as it may be the same or similar to that shown and described in patent to G. Westinghouse, Jr., No. 373,035, November 8, 1887. The switch $e$ beneath the car is shown as having been moved to include its coil $c$ in circuit. The other switches are open. When the car is between two switches, both will be attracted, so that at no time will the supply of current cease. As the currents on the vehicle are rectified, the usual continuous or direct current motor $M'$ is employed to propel the vehicle.

D represents the current-reverser for reversing the current through the armature, thereby reversing the direction of rotation of the armature and likewise changing the direction of movement of the vehicle, and E is an adjustable rheostat for regulating the strength of the current flowing through the motor.

For the purpose of supplying the motor with current in case there is none flowing through the main line or a coil for a time for some reason or other a secondary battery F is provided on the car and arranged to be charged or connected with the vehicle conductor alternately with the motor or whenever the motor-circuit is opened, as when the vehicle is at rest, or may be arranged to be charged simultaneously with the operation of said motor or the flow of current therethrough. The secondary battery may be employed for charging the magnetic-device magnets or for supplying other translating devices on the vehicle, such as electric lamps or heaters.

G is a switch in the vehicle conductors $s'$, leading from the rectifier for connecting either the motor $M'$ or secondary battery F in circuit, and is shown connected with the motor-circuit $s''$, the secondary-battery circuit $l$ being open.

H is a switch for connecting the battery with the motor-circuit or magnetic-device circuit $h$, and $i$ is an adjustable resistance in the magnetic-device circuit for regulating the current therein. The latter circuit extends from the rectifier to the coils $f\,f$, and is completed between the coils by the bar $d$. A suitable inductional transformer or converter may be located in circuit on vehicle, as indicated by the dotted square, to change the character of the current before passing through the rectifier.

J represents iron plates that may be in some cases inlaid in the surface of the road-bed above the movable parts of the switches $e\,e\,e$ to help attract them; but they may generally be dispensed with.

Figs. 4 and 5 respectively represent a side elevation and end view of a car supplied with apparatus very similar to that shown in Fig. 2, with the circuit makers and breakers shown in Fig. 3, and so far like letters of reference represent like parts, a description of which is unnecessary, inasmuch as it has been hereinbefore fully described, but will proceed directly to describe the differentiating features thereof, which are mainly the form of the magnetic device on the vehicle for operating the switches and the closed conduit containing the primary conductors, coils, cores, and switches. The magnetic device in this case consists of a bar or cable of metal $k$, as copper or iron, extending near and parallel to the surface of the road-bed and in the same direction as the movement of the vehicle, and is included in a circuit of very low resistance. This circuit or a portion of it is in inductional relation to the vehicle-conductor, coil, or core, and thereby has induced in it a current of large volume, which, although of an alternating character and flowing through a diamagnetic metal bar, will produce a great attraction, because of the volume of the current flowing therein. This low-resistance circuit is placed in inductional relation to the secondary coil S by having it encircle the coil, as shown. The primary conductors, coils, switches, &c., are all completely insulated through the length of the road and are inclosed in a conduit of any suitable form, which may be greatly varied. It will be sufficient in a description of the same herein to say that each primary coil, with its core and switch and contact, (if the said coil has these parts in connection with it,) is inclosed in a box I of any suitable material, preferably non-magnetic material, and sealed to make the same water-tight, so as to thoroughly protect the apparatus inclosed. Lengths of pipe I' connect the boxes together and with each other and contain the insulated conductor or conductors leading to the apparatus in said boxes. Plugs t, of iron, may extend from the poles of the cores within the boxes through the same to or slightly above the surface of the road-bed to bring the poles nearer to the poles of the vehicle-core or to allow magnetic contact between the said parts by means of brushes.

Fig. 6 shows a modified form of means or connections for including the coils along the road in the vicinity of the vehicle in circuit, so that the current may flow through the coil or coils to energize the same. c c indicate the primary coils, connected in the conductors C in series. o o represent the shunt-paths around the coils and containing the switches e e, normally closed, shunting the coils. p indicates the coil and magnetic device carried on the vehicle over one of said primary coils and switches e, which is raised to break the shunt around the coil c, thereby allowing the said coil to be energized by the current flowing through the same. These switches are intended to be operated in the same manner and by the same means as hereinbefore described in relation to the other figures.

Figs. 8, 9, and 10 show a closed magnetic circuit or circuits obtained by lengthening the cores c' of the primary coils c to make contact with the rails A" of the track upon which the vehicle B moves and forming the secondary coils S around the axles, which constitute in this case the cores S' of the coils. These coils are shown connected in series in the vehicle conductor s, but may be connected in parallel. The secondary coils revolve with the axles; but this is not essential, as they may be held stationary. Stationary brushes n make contact with and bear upon insulated metallic rings n' at each end of the coils. These rings are connected with the terminals of the wire forming the coil. By this plan the primary coils may be distributed a much greater distance apart. Said primary coils can be connected with the circuit in any suitable manner, as illustrated in the other figures of the drawings.

Any matters set out in this application and not claimed are not dedicated to the public; but form subject-matter of my application filed October 23, 1890, Serial No. 369,002, which is a division of this.

Having described my invention, what I claim as new, and desire to secure by Letters Patent, is—

1. In an electric-induction railway, a source of irregular or alternating currents, a conductor extending therefrom, a series of coils distributed apart along the way and connected with the conductor, a vehicle, a conductor on the vehicle in suitable inductional relation to the coils, and a translating device connected with the latter conductor.

2. In an electric-induction railway, a source of irregular or alternating currents, a conductor extending therefrom along the railway, a series of coils distributed apart along the way and connected with the conductor, a vehicle, a secondary circuit on the vehicle in suitable inductional relation to the coils, and an electric motor in the secondary circuit to move the vehicle.

3. In an electric-induction railway, a source of irregular or alternating currents, a conductor extending therefrom along the railway, a series of coils distributed apart along the way and connected with the conductor, a vehicle, a secondary circuit on the vehicle in suitable inductional relation to the coils, and an electric motor to move the vehicle, and controlling devices in the secondary circuit.

4. In an electric-induction railway, a source of irregular or alternating currents, a conductor extending therefrom along the railway, a series of coils distributed apart along the way and connected with the conductor, a paramagnetic core or body for each of said coils, a vehicle, a secondary circuit on the vehicle in suitable inductional relation to one or more of said cores or coils, and a translating device in the secondary circuit.

5. In an electric-induction railway, a source of irregular or alternating currents, a conductor extending therefrom along the railway, a series of coils distributed apart along the way and connected with the conductor, an iron core or body within each of said coils, a vehicle, a secondary circuit on the vehicle in suitable inductional relation to one or more of said cores or coils, and an electric motor in the latter circuit to move the vehicle.

6. In an electric-induction railway, a source of irregular or alternating currents, a conductor extending therefrom along the railway, a series of coils distributed apart along the way and connected with the conductor, iron cores within said coils and having enlarged poles extending beyond the ends of the coils, a vehicle, a secondary circuit on the vehicle in suitable inductional relation to one or more of said cores or coils, and an electric motor in the latter circuit to move the vehicle.

7. In an electric-induction railway, a source of irregular or alternating currents, a conductor extending therefrom, a series of coils distributed apart along the railway and connected with the conductor, a laminated iron core or body for each of said coils, a vehicle, a conductor on the vehicle in inductional relation to one or more of said cores or coils, and a translating device connected with the latter conductor.

8. In an electric-induction railway, a source of irregular or alternating currents, a conductor extending therefrom, a series of coils distributed apart along the railway and connected with the conductor, a laminated iron core or body for each of said coils, a vehicle, a conductor on the vehicle in inductional relation to one or more of said cores or coils, an electric motor to move the vehicle in electrical connection with the latter conductor, and controlling devices.

9. In an electric-induction railway, a source of irregular or alternating currents, a conductor extending therefrom, a series of coils distributed apart along the railway and connected with the conductor, a core or body of iron for each of said coils having poles extended to, beyond, or in proximity to the surface of the road-bed, a vehicle, a conductor on the vehicle in suitable inductional relation to one or more of said cores or coils, and an electric motor to move the vehicle in electrical connection with the latter conductor.

10. In an electric-induction railway, a source of irregular or alternating currents, a conductor extending therefrom, a series of coils distributed apart along the railway and connected with the conductor, a core or body of iron for each of said coils in inductional relation to the latter and having its poles extended to or in proximity to the surface of the road-bed, but located on opposite sides of the center thereof, a vehicle, a conductor on the vehicle in suitable inductional relation to one or more of said cores or coils, and an electric motor to move the vehicle in electrical connection with the latter conductor.

11. In an electric-induction railway, a source of irregular or alternating currents, a conductor extending therefrom, a series of coils distributed apart along the railway and connected with the conductor, a core of iron within each of said coils and having its poles located on opposite sides of the center of the road-bed, a vehicle, a conductor on the vehicle in suitable inductional relation to one, or more of said cores or coils, and an electric motor to move the vehicle in electrical connection with the latter conductor.

12. In an electric-induction railway, a source of irregular or alternating currents, a conductor extending therefrom along the railway, a series of coils distributed apart along the way and connected with the conductor, a paramagnetic core or body within each of said coils in inductional relation to the latter, a vehicle, a conductor on the vehicle in inductional relation to both the cores and coils, and an electric motor to move the vehicle in electric connection with the latter conductor.

13. In an electric-induction railway, a source of irregular or alternating currents, a line conductor extending therefrom along the railway, a series of coils distributed apart along the way and connected with the conductor, a core of iron within each of said coils and having its poles located on opposite sides of the center of the road-bed, a vehicle, a secondary coil upon the vehicle, a core or body of iron for the latter coil in inductional relation to both the cores and coils of the line conductor, and an electric motor to move the vehicle in circuit with the secondary-coil conductor.

14. In an electric-induction railway, a source of irregular or alternating currents, a line conductor extending therefrom along the railway, a series of coils distributed apart along the way and connected with the conductor, a core of iron within each of said coils having its poles extended to or in proximity to the surface of the road-bed, but located on opposite sides of the center thereof, a vehicle, a secondary coil upon the vehicle, a core of iron within the latter coil having its poles extended to or in proximity to the poles of the primary cores and in inductional relation therewith, and an electric motor to move the vehicle in circuit with the secondary-coil conductor.

15. In an electric-induction railway, a source of irregular or alternating currents, a line conductor extending therefrom along the railway, a series of coils distributed apart along the way and connected with the conductor, a laminated core of iron within each of said coils having its poles extended to or in proximity to the surface of the road-bed, but located on opposite sides of the center thereof, a vehicle, a secondary coil upon the vehicle, a laminated core of iron within the latter coil having its poles extended to or in proximity to the poles of the primary cores and in inductional relation therewith, and an electric motor to move the vehicle in circuit with the secondary-coil conductor.

16. In an electric railway, a source of irregular or alternating currents, a conductor or conductors extending therefrom along the way, a laminated paramagnetic core or body having its poles located one on each side of the center of the road-bed, a vehicle, a conductor on the vehicle in suitable inductional relation to the core, and a translating device connected with the latter conductor.

17. In an electric-induction railway, a source of irregular or alternating currents, conductors extending therefrom along the railway, a series of coils distributed apart along the way and connected with the conductor in multiple arc, a vehicle, a conductor on the vehicle in suitable inductional relation to the coils, and a motor to move the vehicle or other electric translating device connected with the latter conductor.

18. In an electric-induction railway, a source of irregular or alternating currents, conductors extending therefrom along the railway, a series of coils distributed apart along the way in multiple arc connected with the conductors, but normally out of circuit, a circuit maker and breaker for each of said coils, a vehicle, a conductor on the vehicle in suitable inductional relation to the coils, a magnetic device on the vehicle to operate the circuit makers and breakers to include one or more coils in the vicinity of the vehicle in circuit, and a motor to move the vehicle or other electric translating device connected with the vehicle conductor.

19. In an electric-induction railway, a source of irregular or alternating currents, a conductor extending therefrom, a series of coils distributed apart along the way and connected with the conductor, but normally out of circuit, a circuit maker and breaker for each of said coils, a vehicle, a conductor on the vehicle in suitable inductional relation to the coils, a magnetic device on the vehicle to operate one or more of the circuit makers and breakers to include one or more coils in circuit in the vicinity of the vehicle, and a motor to move the vehicle or other electric translating device connected with the vehicle conductor.

20. In an electric-induction railway, a source of irregular or alternating currents, a conductor extending therefrom, a series of coils distributed apart along the way and connected with the conductor, but normally out of circuit, a circuit maker and breaker for each of said coils, a vehicle, a conductor on the vehicle in suitable inductional relation to the coils, a magnetic device in circuit with an electric conductor on the vehicle to operate one or more of the circuit makers and breakers to include one or more coils in circuit in the vicinity of the vehicle, and a motor to move the vehicle or other electric translating device connected with the vehicle conductor.

21. In an electric-induction railway, a source of irregular or alternating currents, a conductor extending therefrom, a series of coils distributed apart along the way and connected with the conductor, but normally out of circuit, a circuit maker and breaker for each of said coils, a vehicle, a conductor on the vehicle in suitable inductional relation to the coils, a magnetic device consisting of a bar of metal included in a circuit of very low resistance in inductional relation to the conductor on the vehicle to operate one or more of the circuit makers and breakers to include one or more coils in circuit in the vicinity of the vehicle, and a motor to move the vehicle or other electric translating device connected with the vehicle conductor.

22. In an electric-induction railway, a source of irregular or alternating currents, a conductor extending therefrom, a series of coils distributed apart along the way and connected with the conductor, but normally out of circuit, a circuit maker and breaker for each of said coils, a vehicle, a conductor on the vehicle in suitable inductional relation to the coils, a magnetic device on the vehicle, consisting of a magnetic bar extending near and parallel to the surface of the road-bed and in the same direction as the movement of the vehicle to operate one or more of the circuit makers and breakers to include one or more coils in circuit in the vicinity of the vehicle, and a motor to move the vehicle or other electric translating device connected with the vehicle conductor.

23. In an electric-induction railway, a source of irregular or alternating currents, a conductor extending therefrom, a series of coils distributed apart along the way and connected with the conductor, a vehicle, a secondary circuit entirely on the vehicle in suitable inductional relation to the coils, a current-rectifier in the latter circuit to straighten the currents therein, and an electric motor to move the vehicle or other electric translating device thereon connected in the latter circuit.

24. In an electric-induction railway, a source of irregular or alternating currents, a conductor extending therefrom, one or more coils distributed apart along the way and connected with the conductor, a vehicle, a secondary circuit entirely on the vehicle in suitable inductional relation to the coils, a current-rectifier in the latter circuit to straighten the currents therein, and a continuous or direct current motor to move the vehicle connected in the latter circuit.

25. In an electric-induction railway, a source of irregular or alternating currents, a conductor extending therefrom, a series of coils distributed apart along the way and connected with the conductor, a vehicle, a secondary circuit on the vehicle in suitable inductional relation to the coils, a current-rectifier in the latter circuit to straighten the currents therein, a continuous or direct current motor to move the vehicle connected in the latter circuit, and a secondary battery on the vehicle adapted to be connected in the latter circuit.

26. In an electric-induction railway, a source of irregular or alternating currents, a condutor extending therefrom, a series of coils distributed apart along the way and connected with the conductor, a vehicle, a secondary circuit on the vehicle in suitable inductional relation to the coils, a current-rectifier in the latter circuit to straighten the currents therein, a continuous or direct current motor to move the vehicle, a secondary battery on the vehicle, and a switching device for including the motor and battery in the latter circuit alternately.

27. In an electric railway, a source of irregular or alternating currents, a conductor extending therefrom, a series of coils distributed apart along the way and connected with the conductor, but normally out of circuit, a circuit maker and breaker for each of said coils, a vehicle, a conductor on the vehicle in suitable inductional relation to the coils, a magnetic device on the vehicle in circuit with an electric conductor to operate one or more of the circuit makers and breakers, a current-rectifier on the vehicle for straightening the currents in the conductor thereon, and a motor to move the vehicle or other electric translating device connected with the vehicle conductor.

28. In an electric-induction railway, a source of irregular or alternating currents, one or more entirely insulated conductors extending therefrom along the railway, a vehicle, a secondary circuit entirely on the vehicle in suitable inductional relation to said conducters, a current-rectifier in the latter circuit, and a continuous or direct current motor also in the said circuit.

29. In an electric-induction railway, a source of irregular or alternating currents, a conductor extending therefrom, a series of coils distributed apart along the railway and connected with the conductor, a core or body of iron for each of said coils having poles extended to and in contact with the rails of the track, a vehicle, a body of iron carried by the vehicle in contact with the rails, a conductor on the vehicle in inductional relation to the body of iron, and an electric motor to move the vehicle in electric connection with the latter conductor.

30. In an electric-induction railway, a source of irregular or alternating currents, a conductor extending therefrom, a series of coils distributed apart along the railway and connected with the conductor, a core or body of iron for each of said coils having poles extended to and in contact with the rails of the track, a vehicle, iron axles and wheels for the vehicle to move on the rails, one or more coils on the vehicle in inductional relation to the axles, and an electric motor to move the vehicle and in circuit with the coils.

31. The combination of a car or vehicle movable along a given path, a series of magnetic cores placed at intervals along said path or line of travel, coils surrounding said cores and connected with a source of alternating currents, a magnetic core carried by the car in close proximity to or in contact with the poles of the stationary cores, a secondary conductor wound thereon, and an electro-magnetic motor on the car for propelling the same and connected in circuit with the secondary conductor.

In testimony whereof I have hereunto signed my name this 24th day of June, 1889.

MARK W. DEWEY. [L. S.]

Witnesses:
C. H. DUELL,
J. J. LAASS.